Patented Oct. 7, 1930

1,777,751

UNITED STATES PATENT OFFICE

ARTHUR FRANZ, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

PRODUCING CELLULOSE

No Drawing. Application filed February 16, 1928, Serial No. 254,887, and in Germany August 5, 1926.

The present invention relates to the production of fibrous material from vegetable materials of any kind.

For the production of fibrous material from vegetable materials oxidizing agents as for example nitric or hypochlorous acid or chlorine dioxid have been proposed, but when working with such agents on a large scale, the carbohydrates of the fibrous material are more or less damaged by reason of the prolonged treatment with the said agents or the reaction requires an impracticable length of time.

I have found that the carbohydrates of the fibrous material remain practically unaffected, if chlorates and especially those chlorates, which are more readily soluble in water than potassium chlorate, be allowed to act upon the initial material, in highly concentrated solutions in the presence of moderate quantities of inorganic acids, such as nitric or sulfuric acid, sufficient for liberating chloric acid and in the presence of catalysts, for which purpose use may be made of the salts or oxids of metals, such as copper or nickel or mixtures thereof. The action of the said catalysts has been found to consist in accelerating the formation of small amounts of hydrochloric acid from chloric acid which in turn catalytically assists the action of the chloric acid on the fibrous material, which action, otherwise, without the addition of the said catalysts would occur only in a later stage of the process. Thus, if hydrochloric acid be used as the said inorganic acid, it simultaneously acts as catalyst, and therefore in this case a further addition of the said catalytic materials may be dispensed with and a part of the employed chlorate be replaced by a chlorid as for example sodium or calcium chlorid or the salts contained in the spent lye of a prior preparation of cellulose.

In this case even a slight dilution of the chlorate solution may be employed by reason of the strong catalytic action of the hydrochloric acid.

The temperature employed is preferably maintained between 20° and 80° C., so that, in contradistinction with the usual processes of producing cellulose from vegetable material, such as the sulfite or sulfate or caustic soda process, only a very low consumption of heat occurs. When working in the manner described, the resulting chloric acid acts very quickly upon the material to be treated, due to the action of the said catalysts. By raising the concentration of the chlorate solution, or of the free acid contained therein, or of both, or by raising the temperature within the limit mentioned above, or by employing several of these means, the reaction may be further accelerated, but it is most advantageous to work with a highly concentrated chlorate solution at about 30° C. in order to avoid a too violent reaction by which the fibrous material would be strongly attacked. A further reduction of the time required for the performance of the present process may be obtained by introducing the chlorate solution into the reaction vessel filled with the initial material after having the vessel more or less evacuated so that the liquid readily penetrates the initial material. This effect may be improved by working in a closed vessel the gases resulting during the process giving rise to some degree of pressure. Besides this, losses of oxidizing gases which are thus prevented from escaping are avoided.

Different products may be obtained by treating the resulting cellulosic products with a dilute alkaline lye or with a solution of an alkali metal sulfite or acid sulfate or of ammonia or water solely, and by varying the conditions of such treatment as regards the temperature employed and the concentration of the said solutions. For example a stronger lye of, say, 5 per cent caustic alkali metal hydroxid or a temperature above room temperature is employed if a cellulose free from hemicelluloses is to be obtained, whilst for paper pulp a weak lye or lower temperatures than mentioned above are sufficient for removing only ligneous acids and the like.

The following examples will further illustrate the nature of this invention but the invention is not limited thereto. The parts are by weight.

*Example 1*

1 part of chipped fir wood is soaked with a mixture of 4 parts of sodium chlorate, 0.02 part of crystalline copper nitrate, 0.7 part of nitric acid (spec. gravity 1.4) and 4 parts of water. The mixture is left standing for 72 hours at 30° C. whereupon the liquor is run off and the resulting pulp washed with water. The product obtained in a yield of about 70 per cent of the dry initial material is excellently suitable for a direct production of parchment paper.

*Example 2*

1 part of shipped fir wood is acted upon for 64 hours at 30° C. with a mixture of 4.9 parts of a 20 per cent solution of chloric acid, 3.27 parts of sodium chlorate, 0.02 part of crystalline copper sulfate and 1.2 parts of water. The resulting pulp is washed with water after the liquor has been run off.

*Example 3*

1 part of chipped fir wood is treated for from 5 to 6 hours and at 30° C. with a mixture of 4 parts of sodium chlorate, dissolved in 4 parts of water, 1.8 parts of concentrated sulfuric acid diluted with 0.9 part of water, and 0.06 part of crystalline copper sulfate. After this treatment the resulting pulp is extracted with a 5 per cent solution of sodium hydroxid, for example, by immersing the pulp in the solution and filtering it in a filter-press or the like. On washing with water a product containing about 98 per cent of alpha-cellulose is obtained. On applying the process described above to beech wood, only about ⅗th of the said quantities of the liquor are needed.

*Example 4*

1.5 parts of beech wood are treated for from 6 to 7 hours at 30° C. with 7 parts of a solution of about 50 per cent sodium chlorate, which is mixed with 0.7 part of concentrated hydrochloric acid, and extracted for example in the manner described in Example 1 or 3. The hydrochloric acid is applied in the rather high concentration of 3.3 per cent, so that a high concentration of chloric acid is available.

*Example 5*

50 parts of fir wood are treated with 600 parts of a solution of 25 per cent of calcium chlorate, which is mixed with 55 parts of concentrated hydrochloric acid, and are extracted in any known manner, for example as described in the foregoing examples, after the pulp has been carefully freed from the calcium salts by washing.

Working in this manner is particularly suitable for making pulp from vegetable fibres which are opened without difficulty.

*Example 6*

50 parts of flax refuse are treated for 2½ hours at 30° C. with a mixture of 650 parts of a saturated solution of 3 parts of sodium chlorid and 1 part of sodium chlorate, together with 80 parts of concentrated hydrochloric acid. The resulting pulp is washed in a suitable manner such as by extraction in accordance with the methods described in the foregoing examples.

What I claim is:

1. A process for producing fibrous material from vegetable material which comprises treating the said material at temperatures below 80° C. with a highly concentrated solution of a chlorate, more readily soluble in water than potassium chlorate, in mixture with a moderate quantity of mineral acid, care being taken to provide for the presence of a catalyst capable of producing hydrochloric acid from chloric acid, at least in case the mineral acid is not hydrochloric acid.

2. A process for producing cellulose from vegetable material which comprises treating the said material at temperatures below 80° C. with a highly concentrated solution of a chlorate, more readily soluble in water than potassium chlorate, in mixture with a moderate quantity of mineral acid, care being taken to provide for the presence of a catalyst comprising a compound of a heavy metal capable of producing hydrochloric acid from chloric acid, at least in case the mineral acid is not hydrochloric acid.

3. A process for producing cellulose from vegetable material which comprises treating the said material at temperatures below 80° C. with a highly concentrated solution of a chlorate, more readily soluble in water than potassium chlorate, in mixture with a moderate quantity of mineral acid, care being taken to provide for the presence of copper sulfate, at least in case the mineral acid is not hydrochloric acid.

4. A process for producing cellulose from vegetable material which comprises treating the said material at temperatures below 80° C. at a pressure above atmospheric pressure with a highly concentrated solution of a chlorate, more readily soluble in water than potassium chlorate, in mixture with a moderate quantity of mineral acid, care being taken to provide for the presence of a catalyst capable of producing hydrochloric acid from chloric acid, at least in case the mineral acid is not hydrochloric acid.

5. A process for producing cellulose from vegetable material which comprises treating the said material at temperatures below 80° C. with a concentrated solution of a chlorate, more readily soluble in water than potassium chlorate, in mixture with a moderate quantity of hydrochloric acid.

6. A process for producing cellulose from vegetable material which comprises treating the said material at temperatures below 80° C. with a concentrated solution of sodium chlorate in mixture with a moderate quantity of hydrochloric acid.

7. A process for producing cellulose from vegetable material which comprises treating the said material at temperatures below 80° C. with a concentrated solution of a mixture of sodium chlorate and sodium chlorid in mixture with a moderate quantity of hydrochloric acid.

8. A process for producing cellulose from vegetable material which comprises treating the said material at temperatures below 80° C. with a concentrated solution of a chlorate, more readily soluble in water than potassium chlorate, and comprising spent-lye of a previous operation, in mixture with a moderate quantity of hydrochloric acid.

In testimony whereof I have hereunto set my hand.

ARTHUR FRANZ.